United States Patent [19]

Murdoch

[11] 4,263,719
[45] Apr. 28, 1981

[54] OPTICAL SIGHTING DEVICES

[76] Inventor: Colin A. Murdoch, 14a Hassall St., Timaru, New Zealand

[21] Appl. No.: 824,960

[22] Filed: Aug. 15, 1977

[30] Foreign Application Priority Data

Aug. 16, 1976 [NZ] New Zealand .................. 181766

[51] Int. Cl.³ ............................................. F41G 1/46
[52] U.S. Cl. ........................................ 33/297; 33/245; 33/277; 350/10; 356/247
[58] Field of Search ................ 33/276, 277, 278, 245, 33/297, 298, 246, 265; 350/10; 356/247

[56] References Cited

U.S. PATENT DOCUMENTS

| 2,275,631 | 3/1942 | Johnson | 33/298 |
| 3,190,003 | 6/1965 | O'Brien | 33/297 |
| 3,392,450 | 7/1968 | Herter et al. | 33/297 |
| 3,766,656 | 10/1973 | Westphal | 33/265 |
| 3,948,587 | 4/1976 | Rubbert | 350/10 |

FOREIGN PATENT DOCUMENTS

| 298589 | 11/1965 | Netherlands | 33/277 |
| 3729 | of 1881 | United Kingdom | 33/277 |

Primary Examiner—William D. Martin, Jr.
Attorney, Agent, or Firm—Fisher, Christen & Sabol

[57] ABSTRACT

An optical device for use as a gunsight, telescope or viewfinder is disclosed, the device being capable of indicating the distance of the target from the user. This is accomplished by a reticle in, or associated with, the sighting device, the reticle being calibrated to give the viewer an instant indication of range without requiring mechanical adjustments.

4 Claims, 9 Drawing Figures

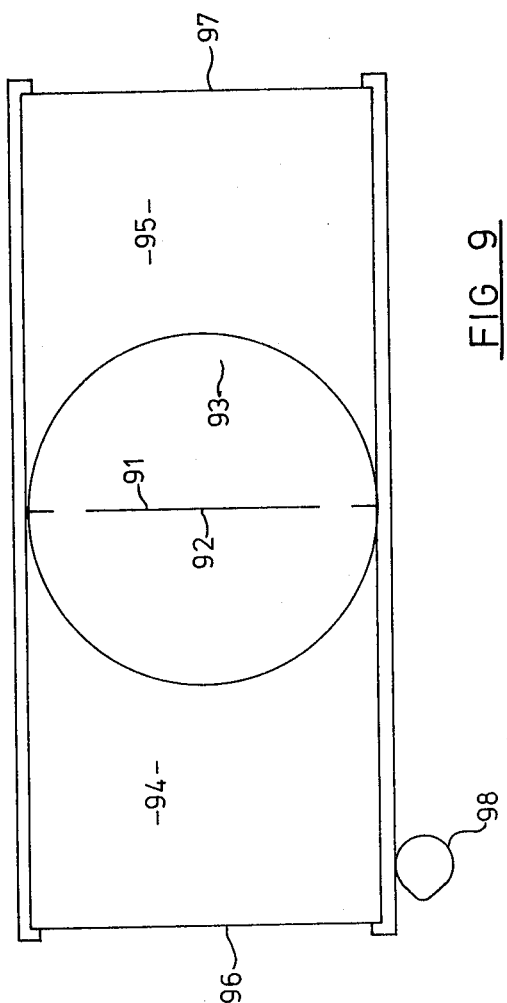

OPTICAL SIGHTING DEVICES

FIELD OF THE INVENTION

This invention relates to optical devices, for example gunsights, telescopes and viewfinders of cameras. The principal object of the invention is to provide improved incorporation of information for the user of the optical device within the user's field of view in the device.

BRIEF DESCRIPTION OF THE PRIOR ART

It is known to provide optical devices such as weapons sights, surveyor's telescopes and camera viewfinders with means of conveying information about, for example, the range of the viewed object or trajectory corrections, by means of indicators which are visible to the operator in his field of view in the device. Such means, if they have had a reasonable flexibility of applications, have incorporated mechanical movements requiring either adjustment while the operator views the target or object (for example split-image and parallax-correction rangefinders) or presetting to a selected setting which then becomes the only one available to the operator until the device is reset (for example useful range indicators in aircraft gunsights).

SUMMARY OF THE INVENTION

The present invention provides principally means whereby an optical device, relying on principals of optical geometry and, where applicable, principles of ballistics, can supply the user with information about range and trajectory without requiring mechanical adjustments to provide such information.

BRIEF DESCRIPTION OF THE DRAWINGS

FIG. 9: is a side elevation showing in section a part of a second optical device constructed according to the invention.

DETAILED DESCRIPTION OF THE PREFERRED EMBODIMENTS

It is known that in an objective of a telescope or microscope, or other optical system producing a real image of an object, the graph of the linear size of the image as a function of the distance of the object from the optical system is a hyperbolic curve. A portion 10 of such a curve is shown in FIG. 1, the abscissa being the linear size of the image and the ordinate being the distance of the object from the optical system.

Figure 1:
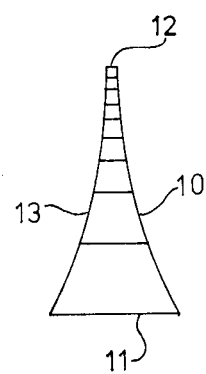
FIG. 1: is a diagram of a typical perspective characteristic of a focussable optical system.

In FIG. 1 the line 11 represents the linear size of the real image of a selected object at a relatively small distance from the optical system and the line 12 represents the linear size of the real image of the same object at a greater distance from the optical system. The ends of all such lines between 11 and 12 form a curve 13 which is a mirror image of the curve 10. If FIG. 1 is incorporated into a reticule of an optical system such as a telescope, a weapons sight or a camera viewfinder, it can provide immediate indication of range by matching the image linear size of an object of known size against the spacing between the curves 10 and 13 or against lines such as 11 and 12 which are spaced at intervals representing convenient ranges, the curves or the lines being suitably calibrated in distance measurements according to the lateral magnification of the optical system. If desired a reticule may include the curves 10 and 13, the lines representing a series of image linear sizes, or both the curves and the lines as shown in FIG. 1, and the diagram shown in FIG. 1 may be inverted.

Figure 2:
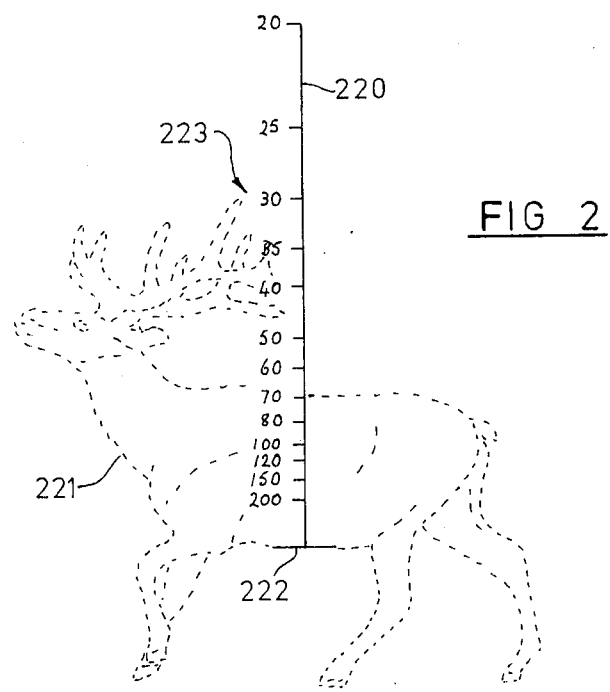
FIG. 2: shows a portion of a rangefinding reticule of a telescopic gunsight.

In the embodiment shown in FIG. 2 the linear sizes of the image for the various ranges are plotted not as a curve but as calibrations 223 on a line 220. In the reticule shown in FIG. 2, the line 220 is vertical for comparison with the body depth of a red deer 221, but it might equally be horizontal or inclined according to the nature of the object to be viewed. When the gunsight is in use, the end 222 of the line, representing infinite range, is matched against one extremity of a reference object, in this case the belly of a deer. The body depth of the target is assumed to be 45 cm and the calibrations represent the apparent body depth at the indicated distances from the gunsight. As illustrated in FIG. 2, the deer is 70 meters from the gunsight.

Rangefinders of the type shown in FIGS. 1 and 2 are particularly suitable for use in telescopic gunsights, but have applications also in other weapons sights and optical systems wherein it is desired to obtain a quantitative indication of range. The invention is not limited to novel reticules for lenses, but includes also electronic and other means comparing the length of an image produced by an optical device with known lengths of such image at a plurality of distances from the optical device. Possible applications in the fisheries protection and weather mapping fields include the use of the invention to provide visible indications of range, or of the size of an object where range is known, in photographs or in electronic displays.

In the embodiments shown in FIGS. 3, 4, 5, and 6, the curves of FIG. 1 are inverted and the ordinates of the curves are not merely the range of the object viewed, but also a function of the ballistic properties of selected weapons, the vertical spacing between successive lines 31 indicating increments in the elevation of the weapon required to strike a target at the ranges indicated by comparison of the apparent size of the target with the lines. Each reticule includes a vertical sighting line 32 and a horizontal base sighting line 33, their intersection 34 representing the sighting point for a target sufficiently close for the weapon to be fired with zero elevation. The lines 31 are bisected by the vertical sighting line 32, and therefore the intersection of the vertical line 32 with each line 31 is the sighting point for the range indicated by the line 31.

Each line 31 is broken into portions 35, 36, 37 and gaps 38, 39 which permit a multiplicity of targets to be used to establish range. The lines of the reticules shown may be used, for example, to establish the ranges of objects of 7.5 cm (each gap 38, 39), 22.5 cm (half of line 36, to one side of the vertical line 32), 30 cm (lines 35, 37), 45 cm (the whole of the line 36), and any combination of adjacent lines and gaps up to 120 cm (the whole line 31) in size.

In each of the reticules shown the relative spacings of the various lines 31 is the same—the reticules differ only in their degrees of elongation or compression of the total space between the base line 33 and the lowest line 31, the relative amounts of the distance which are marked off by each line 31 being constant. The applicant has established that the relative spacing shown in the drawings is correct for substantially all projectile weapons.

FIGS. 3, 4, 5, and 6 are reproductions of the actual master patterns used by the applicant to make reticules for telescopic gunsights for all commonly used sporting rifles. The four reticules are intended to be used with the following rifles.

Figure 3:
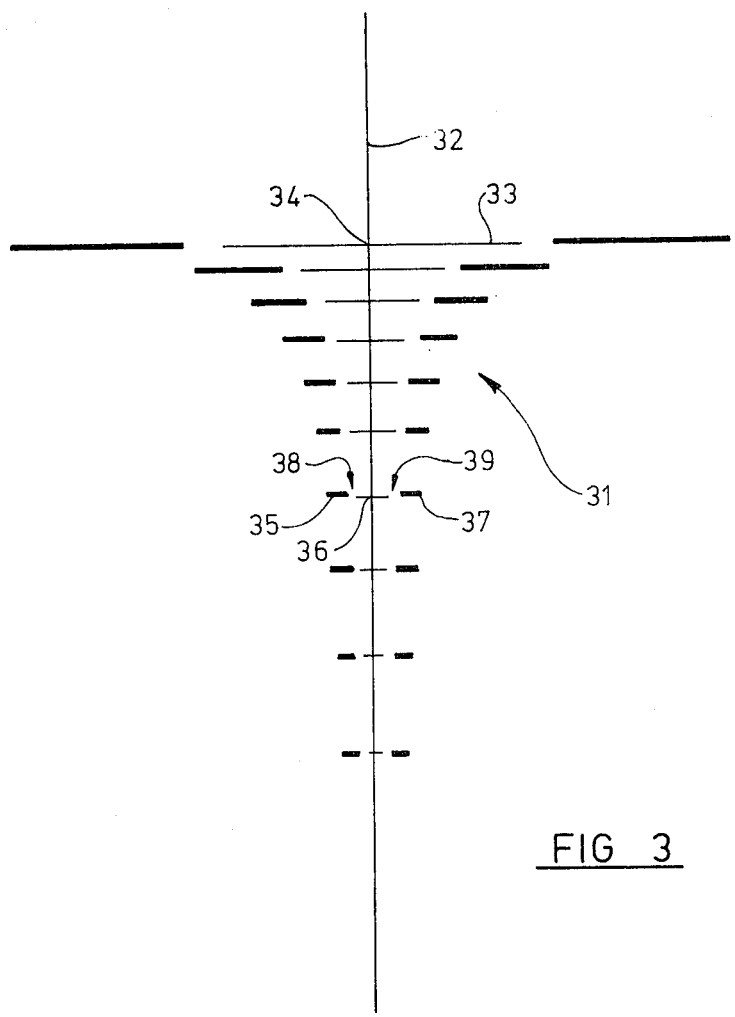
FIGS. 3, 4, 5 and 6: show four reticules for telescopic gunsights for four classes of sporting rifle.

FIG. 3: express, flat-trajectory rifles, typically the following:

| Calibre | Bullet weight (grains) | Muzzle velocity (m/sec.) |
|---|---|---|
| .244 Remington | 75 | 1067 |
| .243 Winchester | 80 | 1067 |
| .270 Winchester h.s. | 130 | 957 |
| .308 Winchester | 110 | 1018 |
| .222 Remington magnum | 55 | 1006 |
| .280 Remington | 150 | 881 |
| .30–06 Springfield | 150 | 905 |

Figure 4:
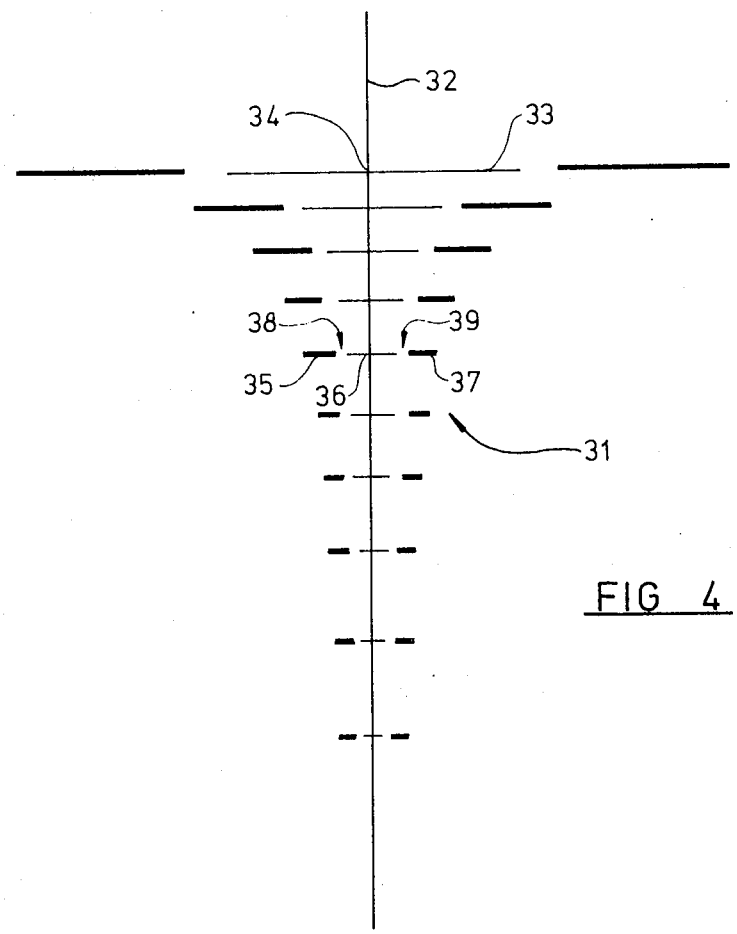

FIG. 4: high velocity rifles of higher trajectory, typically:

| Calibre | Bullet weight (grains) | Muzzle velocity (m/sec.) |
|---|---|---|
| .300 magnum | 180 | 835 |
| .250 Savage | 87 | 924 |
| .270 Winchester | 150 | 853 |
| .30–06 Springfield | 180 | 823 |
| .300 Savage | 150 | 814 |
| .250 Savage | 100 | 860 |
| .30–06 Springfield | 150 | 856 |

Figure 5:
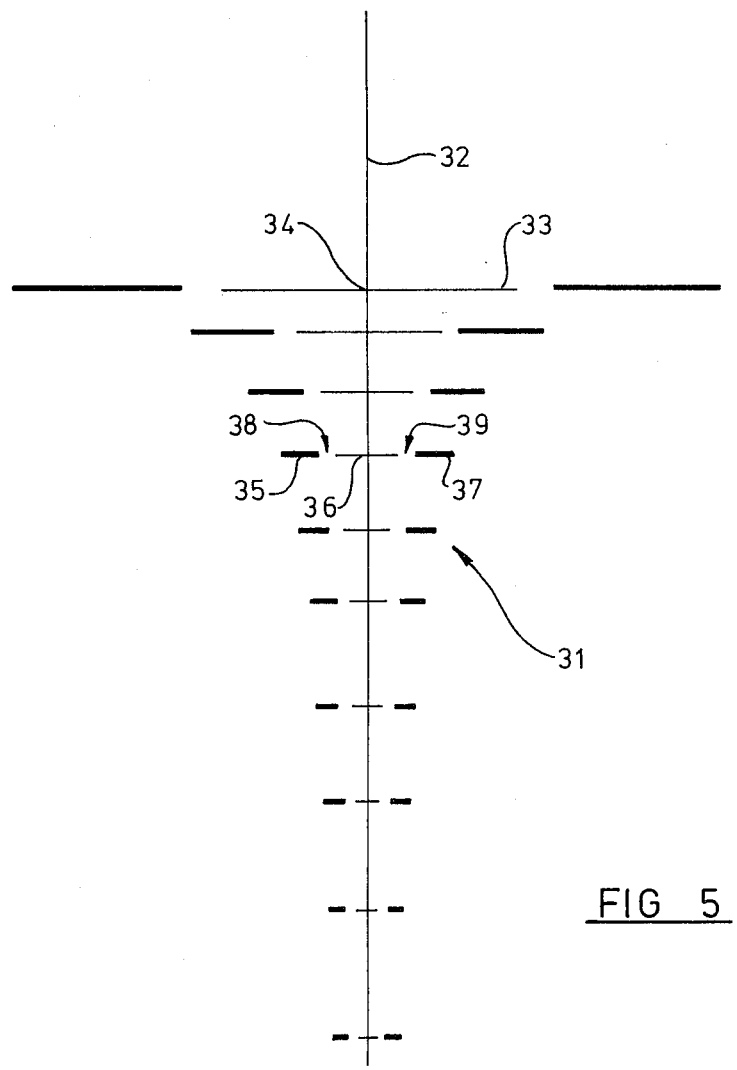

FIG. 5: medium trajectory rifles, typically the following:

| Calibre | Bullet weight (grains) | Muzzle velocity (m/sec.) |
|---|---|---|
| .243 Winchester | 100 | 936 |
| .30–06 Springfield | 150 | 905 |
| .300 Savage | 180 | 722 |
| .3030 Winchester | 150 | 735 |
| 8mm LHS | 170 | 805 |
| .22 Hornet | 45 | 820 |
| .35 Remington | 150 | 723 |

Figure 6:
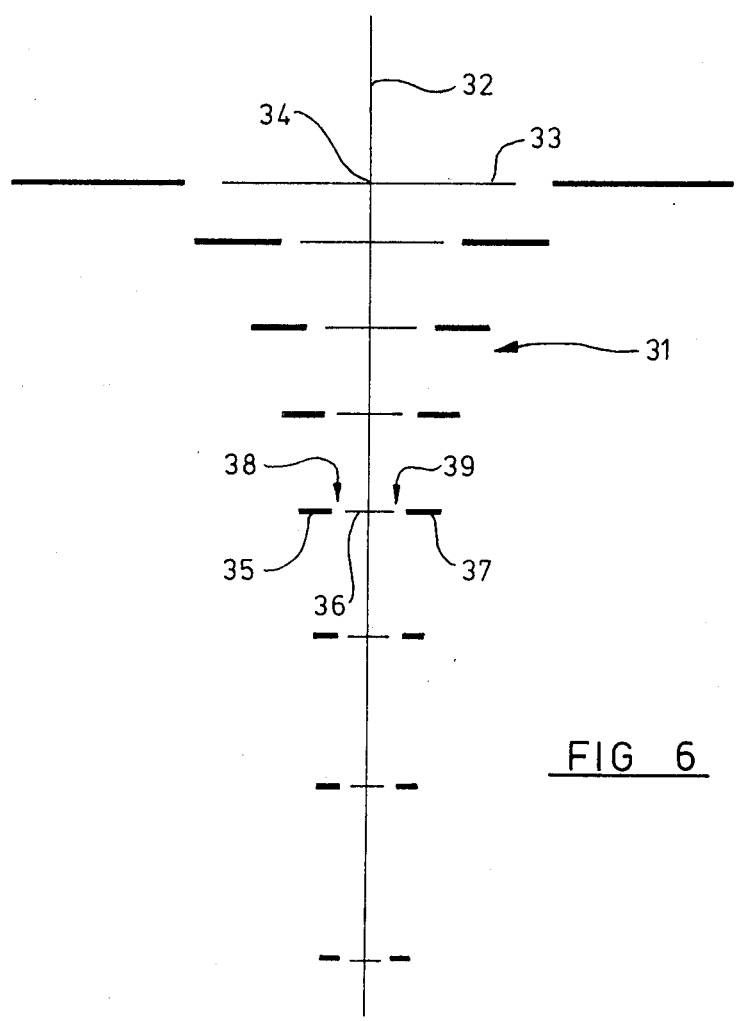

FIG. 6: high trajectory rifles, typically the following:

| Calibre | Bullet weight (grains) | Muzzle velocity (m/sec.) |
|---|---|---|
| .3030 Winchester | 160 | 677 |
| .32 Winchester | 170 | 695 |
| 7mm M.E. | 175 | 757 |
| .348 Winchester | 200 | 771 |
| .30–06 Springfield | 220 | 735 |
| .303 | 180 | 652 |
| .30–40 Krag. | 220 | 671 |
| .30 Remington | 170 | 677 |

In each case, the zero elevation line 33 represents all ranges up to 200 meters and succeeding lines 31 represent range increments of 100 meters.

The drawings in FIGS. 3, 4, 5 and 6 are the patterns actually used by the applicant, each being reduced to a scale which is appropriate to, firstly, the selected object the apparent length of which is to be matched against the lines 31 and, secondly, the lateral magnification, if any, of the weapons sight in which the reticule is to be used. For example, the reticules may be reduced to such a scale that the lines 31 represent the apparent body length of a red deer (typically 125 cm) when viewed through the gunsight. Like the reticule of FIG. 1, the reticules of FIGS. 3, 4, 5 and 6 may comprise the lines 31 only (as shown in the drawings), the lines 31 and the curves formed by their ends, or such curves only. The forms shown in the drawings are preferred because of their simplicity; it has been found that the user is able to estimate the range and elevation for targets falling between the lines, and also that the user is able to compensate for targets which are not of the selected reference size. Reticules of this type are obviously not restricted to sporting rifles alone, but may be used in conjunction with any ballistic weapon where the target is sighted by the user.

Figure 7:
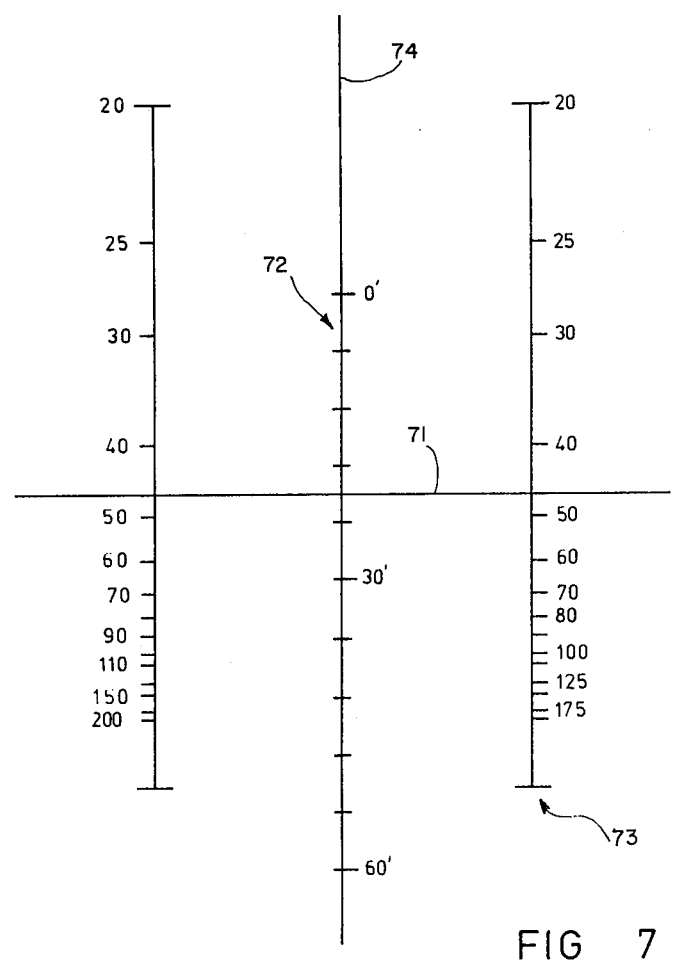
FIG. 7: shows a reticule for a telescopic gunsight which indicates alterations in elevation of a gun to compensate for known alterations of its trajectory.

Certain firearms, for example some rifles and pistols which fire syringes, have a variable trajectory achieved by, for example, varying the muzzle velocity. Such variation may also be the result of changing the loads of conventional firearms. Where such variations are frequent and are of known quantity, the present invention as illustrated in FIG. 7 provides a means of directly indicating the changes in elevation of a firearm required to compensate for the trajectory changes. In the reticule of a weapons sight, a horizontal crosshair 71 is movable vertically relative to the target image. A visible scale 72 indicates the elevation of the firearm in degrees. A rangefinder scale 73 of the type shown in FIG. 2 is included. When the trajectory of the weapon is altered by a known amount, the horizontal crosshair 71 is moved vertically relative to the scale 72, its intersection with a vertical crosshair 74 indicating the point of impact on the target.

This form of the invention is suitable particularly for the applicant's "Paxarms" syringe rifles wherein a rotary control varies the muzzle velocity by known amounts and causes known changes in the trajectory of a syringe fired from the rifle. The movement of the horizontal crosshair 71 may be mechanically connected to the muzzle velocity control so that changes in that control to vary the terminal impact of the syringe automatically cause the appropriate elevation corrections to be made in the sighting reticule.

Figure 8:
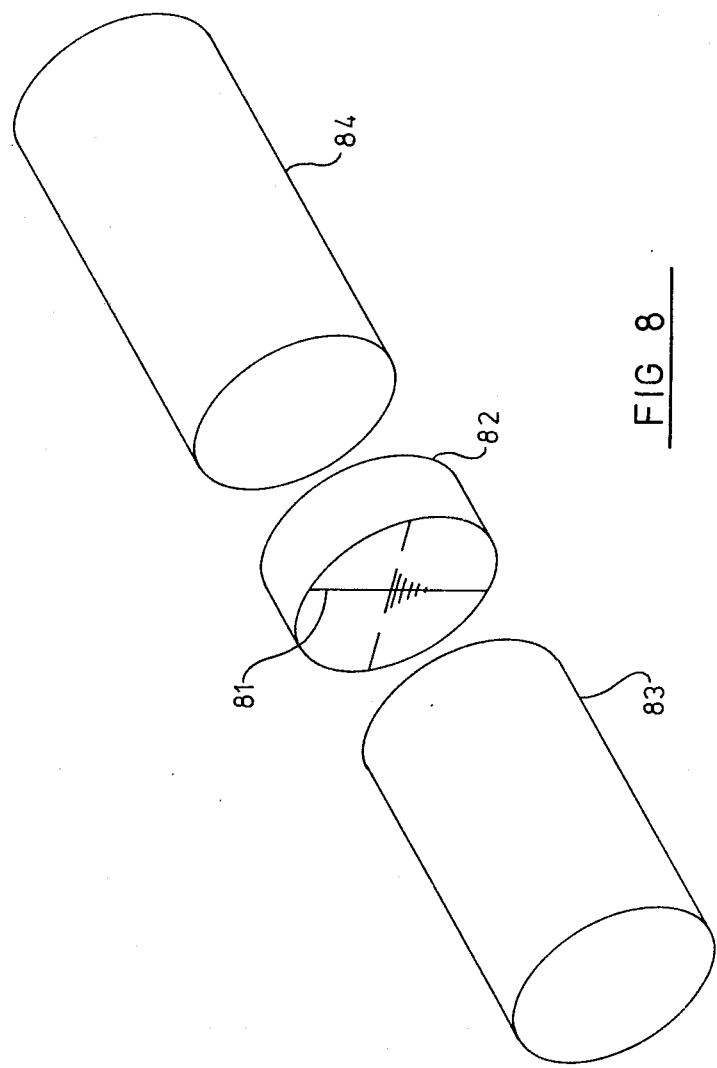
FIG. 8: is an exploded perspective view of a part of a first optical device constructed according to the invention.

The reticules of FIGS. 1 to 7 may be formed in a variety of fashions known in the art of reticule construction. FIG. 8 shows a means of forming a reticule which is suitable for a wide range of optical devices and which is very robust. A reticule comprises a pattern of lines 81 marked on the face of a block of transparent material 82, preferably optically inert glass, which is arranged in the light path of the optical device so that the pattern 81 is silhouetted against the object viewed through the optical device. Preferably the block 82 is supported by further such blocks 84 and 83. This reticule construction is particularly suitable for telescopes, but is applicable also to other types of optical device.

A method of making such a reticule comprises forming an image of the reticule pattern 81 on a photosensitive coating placed on the block 82 (for example from the patterns herein referenced FIGS. 3, 4, 5 and 6, by means of a process camera) and etching the pattern into the block, for example with hydrofluoric acid. The etched pattern may then be darkened.

Telescopic weapons sights which are provided with variable lateral magnification are conventionally constructed using a fixed-focus objective forming a real image of the targets substantially in one focal plane, all such targets being comprised within the depth of field of the lens focussed near infinity. A compound ocular lens system then provides variable lateral magnification of the real image so formed. The reticules provided by this invention are preferably placed substantially in the focal plane of the objective, thus maintaining a fixed relationship with the real image produced by the objective notwithstanding variation of the lateral magnification of the ocular. By this means the reticules of this invention which rely on a known relationship between the indicators within the reticule and the size of the image conveyed to the user can operate in optical systems of variable lateral magnification. The construction shown in FIG. 8 is particularly suitable for such mounting of the reticule within a body of a weapons or camera optical system. In general, in any optical system having variable lateral magnification, the reticule should preferably be situated in the light path before that portion of the system in which the lateral magnification is varied, so as to bear a constant relationship with the size of the image formed by the system.

To achieve the movement of the horizontal line 71 shown in FIG. 7 when such line is formed on the block 82 of FIG. 8, such block and, preferably, also its supporting blocks 83 and 84 may be movable perpendicularly to the optical axis of the optical system or by inclination about the optical axis. For example, where the horizontal line 71 is moved by mechanical means connected with control means affecting the trajectory of a weapon, such mechanical means may, in the first part of its movement, move the blocks 82, 83 and 84 bodily upwardly or donwardly and, in the rest of its movement, tilt the blocks relative to the optical axis to provide displacement of the target image and the scale 73 relative to the line 71 by refraction. Such movements are readily achieved by use of a cam acting on the blocks.

FIG. 9 shows a variant of the construction shown in FIG. 8. Reticule markings as shown in FIG. 6 lie on a plane 91 passing through the centre 92 of sphere 93 made of optically inert glass. The plane 91 is normal to the path of light through the optical device. The sphere 93 is mounted to rotate about an axis normal to the page and passing through the centre 92. Blocks 94, 95 of optically inert glass surround the sphere 93 to form a right cylinder with its end faces 96, 97 normal to the path of light passing through the optical device. The sphere is lapped and ground into the blocks or rotation relative thereto. The blocks are mounted for rotation independently of the sphere about the same axis as the sphere.

Rotation of the sphere is controlled by a calibrated control means, for example a knob mounted on the side of a telescopic gunsight and calibrated in settings for various classes of firearm. As the sphere is rotated the reticule markings move slightly away from the plane 91 and appear to be foreshortened, thus the reticule of FIGS. 3, 4 and 5 can be obtained by suitable degrees of rotation of the sphere.

The blocks are rotated to a very small degree by cams, e.g. 98 which are directly controlled by the user (for example, by a rotatable knob mounted on the side of a telescopic gunsight). The blocks may further be rotatable about an axis perpendicular to the axis aforesaid, thus providing means for complete parallax correction by refraction of the target. Rotation of the blocks causes a minute degree of refraction of the image of the target by the end faces 96, 97 which displaces the target image relative to the reticule. The cylinder should be mounted in a weapons sight so that the plane 91 is substantially the focal plane of the objective of the sight.

The construction shown in FIG. 9 provides the advantages of that shown in FIG. 8 and, in addition, allows a single reticule means to indicate elevations for a wide variety of weapons.

I claim:

1. In a reticule for use with a weapon and having means thereon for estimating the distance between said weapon and a target having an estimable dimension in a generally horizontal plane, said reticule including a generally vertical sighting line and a generally horizontal base sighting line, the improvements comprising a plurality of vertically displaced segmented horizontal lines intersecting the vertical sighting line, the vertical spacing between the segmented horizontal lines defining a constant range increment such that the intersection of each of the segmented horizontal lines with the vertical sighting line indicates the point of impact on the target of a projectile fired from said weapon at that range from the target, wherein end points of said segmented horizontal lines lie on hyperbolic curves disposed on either side of said vertical sighting line, the lengths of each of the corresponding segments and the widths of each of the corresponding spaces between segments of successive segmented lines respectively corresponding to the estimable dimension of a particular target at that range increment.

2. The improved reticule of claim 1, wherein each of said segmented lines are centered on said vertical sighting line.

3. The improved reticule of claim 1, wherein each of segmented lines comprises a pair of visible horizontal lines horizontally spaced from said vertical sighting line.

4. The improved reticule of claim 3 wherein each of said pair of visible horizontal lines are portions of a segmented horizontal line centered on said vertical sighting line.

* * * * *